United States Patent
Rogers et al.

(10) Patent No.: US 8,201,144 B2
(45) Date of Patent: Jun. 12, 2012

(54) METHOD AND SYSTEM FOR DISTRIBUTING SOFTWARE COMPONENTS

(75) Inventors: Tony Rogers, Mooroolbark (AU); Christopher Betts, Mt. Dandenong (AU)

(73) Assignee: CA, Inc., Islandia, NY (US)

( * ) Notice: Subject to any disclaimer, the term of this patent is extended or adjusted under 35 U.S.C. 154(b) by 1622 days.

(21) Appl. No.: 11/556,228

(22) Filed: Nov. 3, 2006

(65) Prior Publication Data

US 2008/0109540 A1 May 8, 2008

(51) Int. Cl.
*G06F 9/44* (2006.01)
*G06F 9/45* (2006.01)

(52) U.S. Cl. ........ 717/120; 717/121; 717/151; 717/154; 717/155; 717/156

(58) Field of Classification Search ............ 717/120, 717/121, 151, 154–156; 707/797, 807, 828, 707/829

See application file for complete search history.

(56) References Cited

U.S. PATENT DOCUMENTS

| | | | |
|---|---|---|---|
| 6,687,735 B1 * | 2/2004 | Logston et al. | 709/203 |
| 7,007,033 B1 * | 2/2006 | Rothschiller et al. | 707/999.101 |
| 7,020,662 B2 * | 3/2006 | Boreham et al. | 707/758 |
| 7,401,070 B2 * | 7/2008 | Kiji | 707/999.003 |
| 2006/0130050 A1 | 6/2006 | Betts et al. | |

OTHER PUBLICATIONS

Chien, Andrew A. "Concurrent Aggregates: Using Multiple-Access Data Abstractions to Manage Complexity in Concurrent Programs", 1991, ACM, p. 31-36.*
Jiang, et al. "Memory Access Analysis and Optimization Approaches on Splay Trees", 2004, ACM, p. 1-6.*

* cited by examiner

*Primary Examiner* — Qamrun Nahar
(74) *Attorney, Agent, or Firm* — Baker Botts L.L.P.

(57) ABSTRACT

The present invention is directed to a method and system for distributing software components. In accordance with a particular embodiment of the present invention, a distribution hierarchy is established. The distribution hierarchy includes nodes associated with software components. A distribution path in the distribution hierarchy may be determined. The distribution path includes one or more of the nodes that are associated with a particular software application. One or more of software components may be distributed in accordance with the determined distribution path.

21 Claims, 3 Drawing Sheets

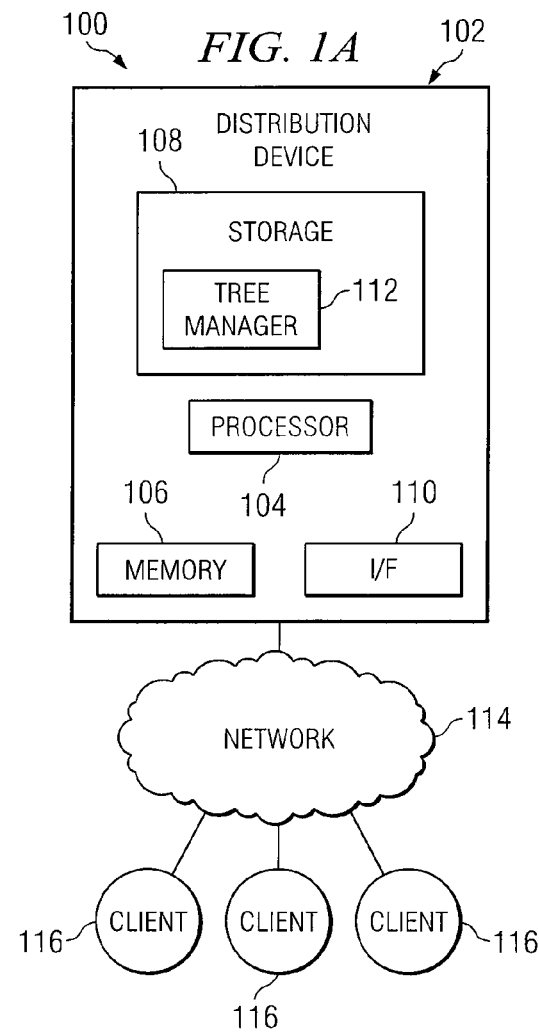
FIG. 1A
FIG. 1B
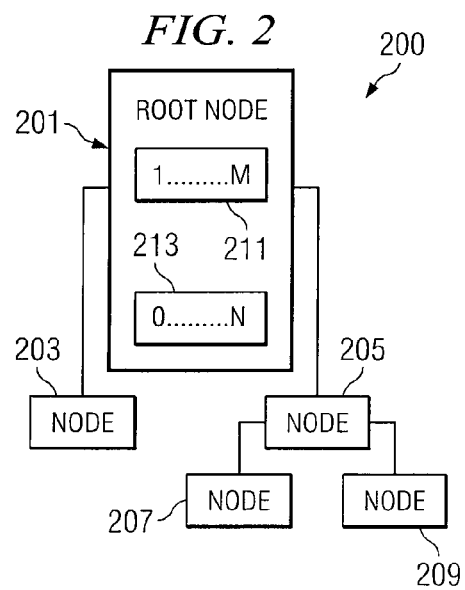
FIG. 2
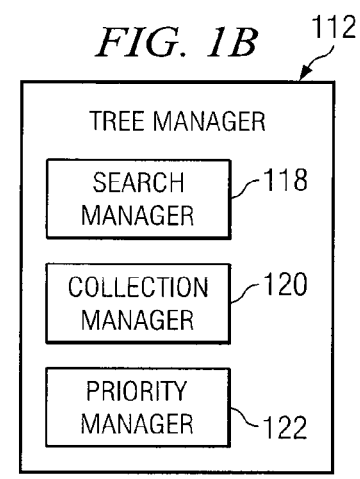
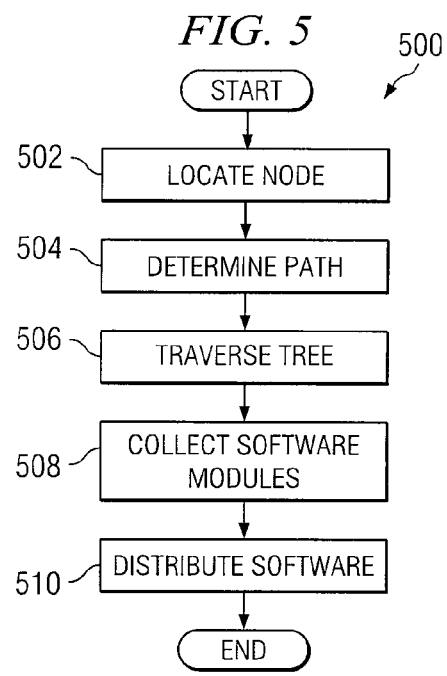
FIG. 5

METHOD AND SYSTEM FOR DISTRIBUTING SOFTWARE COMPONENTS

TECHNICAL FIELD

The present disclosure relates generally to software distribution, and more particularly to a method and system for distributing software components.

BACKGROUND OF THE INVENTION

It has become quite common for organizations to have networks spanning large areas with a large number of client devices. For example, many government, commercial and educational organizations have enterprise systems that include hundreds of client devices operating globally. The dispersed nature of such client devices makes distributing software a difficult and resource intensive task.

Software distribution for such client devices is often made according to a one-size-fits-all strategy. Under this strategy, identical software is distributed to all client devices regardless of actual requirements. In an office environment, this approach is often problematic as there may be users that reject the new software because they are already productive and familiar with old software. Similarly, advanced users may be deprived of the cutting edge tools provided in new software that they need for their own work. In a server environment, this approach also leads to difficulties as unnecessary patches are applied to client devices, affecting stability for no functional gain.

SUMMARY OF THE INVENTION

The present invention is related to a system and method for distributing software components. The teachings of the present invention allow customized software components to be downloaded to client devices in a manageable manner.

In accordance with a particular embodiment of the present invention, a method for distributing software components includes establishing a distribution hierarchy. The distribution hierarchy includes nodes associated with software components. The method further includes determining a distribution path in the distribution hierarchy. The distribution path includes one or more of the nodes that are associated with a particular software application. The method further includes distributing one or more of software components in accordance with the determined distribution path.

Technical advantages of particular embodiments of the present invention include a system and method for distributing software components that store software components in a distribution hierarchy, thereby allowing software components to be downloaded to client devices in a manageable manner. The distribution hierarchy is logically a group of nodes in a distribution tree that conceptually covers all the different software components in a client device. Such software components may be different applications, different versions of the same applications, or different optional functional units of an application. Thus, different software requirements of users and client devices may be easily managed.

Further technical advantages of particular embodiments of the present invention include a system and method for distributing software components that works from a root node of the distribution tree to a data node containing just the specified client devices. As the traversal is made, different software components may be collected from the different nodes, and any existing software components may be overwritten. Thus, the complexity and performance bottlenecks typically associated with distributing large numbers of applications across many machines is avoided.

Further technical advantages of particular embodiments of the present invention include a system and method for distributing software components that may be particularly applicable to the client devices where the software may be constrained by various factors such as the hardware of the client device, the vendor, and many other complex factors.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which:

FIG. 1A is a block diagram illustrating a system for distributing software components according to the teachings of the present invention;

FIG. 1B is a block diagram illustrating an example tree manager of the system of FIG. 1A in accordance with an embodiment of the present invention;

FIG. 2 is a block diagram illustrating an example directed acyclic graph suitable for use in accordance with the teachings of the present invention;

FIG. 5 is a flow diagram illustrating a method for distributing software components, according to an embodiment of the present invention.

DETAILED DESCRIPTION OF THE INVENTION

Figure 3:
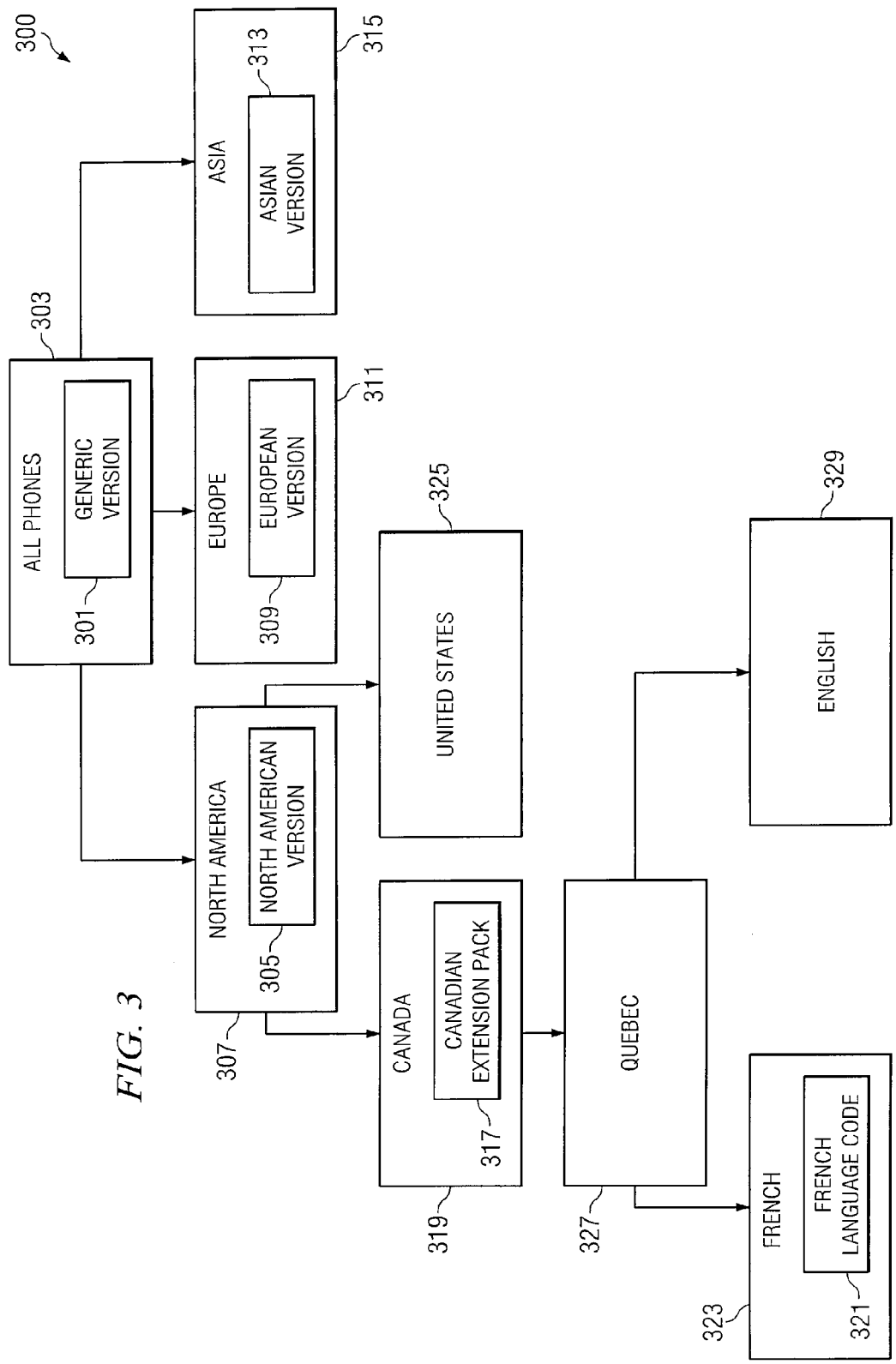
FIG. 3 is a block diagram illustrating an example distribution tree suitable for use in accordance with the teachings of the present invention.

With the ever changing complexity of enterprise systems, enterprises must utilize creative and efficient ways to manage client devices. Additionally, with the wide assortment of threats facing security and integrity, close management of client devices has become indispensable. However, with the large and growing quantity of client devices in use, administrators may experience many problems managing all of the client devices that are in use by the enterprise.

One example of a problematic aspect of computer management is the distribution of software. An enterprise may often wish to distribute computer software packages to one or more client devices associated with the enterprise. For example, an enterprise may wish to install a computer application on dozens or hundreds of computers world-wide. One solution may be to adopt a one-size-fits-all strategy where the identical software to be used by all computers is distributed.

However, distribution of these software packages often require custom settings specific for each computer because different computer platforms may have different needs. For example, a computer running one operating system may require different software than another computer running another operating system.

In accordance with the teachings of the present invention, custom software is distributed according to a distribution hierarchy. The distribution hierarchy is provided such that a client device (for example, a work station, a server, or any other electronically configurable device) may receive custom software by identifying a corresponding node within the distribution hierarchy and then gathering software components, in hierarchical order, from the root node down to the identified node. Thus, the software components are collected in a cascading pattern. Other benefits of cascading collections are described in pending U.S. application Ser. No. 10/999,693 entitled "Cascading Configuration Using One or More Configuration Trees" filed Nov. 30, 2004, which is incorporated by reference herein.

Software components associated with superior nodes of the distribution hierarchy may contain more general software components while child nodes of the distribution hierarchy may contain more specific software components. As the distribution hierarchy is traversed, software components may conflict. For example, a parent node may define a particular software component, but a child node to the parent node may define a more specific software component. Such conflicts may be resolved in favor of the more specific software component and hence the distribution evolves from the general to the specific as the distribution hierarchy is traversed.

By establishing the distribution hierarchy, it is not necessary to define custom software for each individual client device. Similarly, custom software need not be developed for client devices that may require more general software.

In accordance with a particular embodiment of the present invention, multiple distribution trees may be used in a single distribution hierarchy when the software components may be categorized in multiple ways. In particular embodiments, a search order may be defined for the multiple distribution trees.

FIG. 1A is a block diagram illustrating a system 100 for distributing software components according to the teachings of the present invention. As shown in FIG. 1A, system 100 generally includes a server 102, a network 114, and clients 116. System 100 is particularly adapted for distributing software components to clients 116.

Client device 116 may refer to any suitable device operable to communicate with server 102 through network 114. Client device 116 may execute with any of the well-known MS-DOS, PC-DOS, OS-2, MAC-OS, WINDOWS™, UNIX, or other appropriate operating systems, including future operating systems. Client device 116 may include, for example, a personal digital assistant, a computer such as a laptop, a cellular telephone, a mobile handset, or any other device operable to communicate with server 102 through network 114.

Network 114 may refer to any interconnecting system capable of transmitting audio, video, signals, data, messages, or any combination of the preceding. Network 114 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

In particular embodiments of the invention, network 114 may transmit information in packet flows. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

Network 114 may utilize communication protocols and technologies to transmit packet flows. Example communication protocols and technologies include those set by the Institute of Electrical and Electronics Engineers, Inc. (IEEE) standards, International Telecommunications Union (ITU-T) standards, European Telecommunications Standards Institute (ETSI) standards, Internet Engineering Task Force (IETF) standards, or other standards. As an example, network 114 may utilize the IEEE 802.xx standards such as the 802.11 standards.

Server 102 may refer to any suitable device operable to process data. Examples of server 102 may include a host computer, workstation, web server, file server, a personal computer such as a laptop, or any other device operable to process data. Server 102 may execute with any of the other well-known MS-DOS, PC-DOS, OS-2, MAC-OS, WINDOWS™, UNIX, or other appropriate operating systems, including future operating systems.

According to the illustrated embodiment of the invention, server 102 includes a processor 104, a memory device 106, a storage device 108, a communication interface (I/F) 110, and a tree manager 112.

Processor 104 may refer to any suitable device operable to execute instructions and manipulate data to perform operations for server 102. Processor 104 may include, for example, any type of central processing unit (CPU).

Memory device 106 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Storage device 108 may refer to any suitable device operable for storing data and instructions. Storage device 108 may include, for example, a magnetic disk, flash memory, or optical disk, or other suitable data storage device.

I/F 110 may refer to any suitable device operable to receive input for server 102, send output from server 102, perform suitable processing of the input or output or both, communicate to other devices, or any combination of the preceding. I/F 110 may include appropriate hardware (e.g. modem, network interface card, etc.) and software, including protocol conversion and data processing capabilities, to communicate through a LAN, WAN, or other communication system that allows server 102 to communicate to other devices. I/F 110 may include one or more ports, conversion software, or both.

Tree manager 112 may refer to any suitable logic embodied in computer-readable media, and when executed, that is operable to perform various functions including facilitating distributed custom software from server 102. In the illustrated embodiment of the invention, tree manager 112 resides in storage device 108. In other embodiments of the invention, tree manager 112 may reside in memory device 106, or any other suitable device operable to store and facilitate retrieval of data and instructions.

FIG. 1B is a block diagram illustrating an example tree manager 112 of the system of FIG. 1A in accordance with an embodiment of the present invention. Tree manager 112 may include various components operable to perform various functions including a search manager 118, a collection manager 120, and a priority manager 122.

In general, tree manager 112 may facilitate the storage of software components in a distribution hierarchy, thereby allowing customized software components to be downloaded to clients 116 in a manageable manner. A distribution hierarchy may refer to a logical group of nodes in a distribution tree that conceptually covers all the different software components in a client device. A distribution tree may refer to any data structure that arranges all the different software components in tree format. Such software components may be different applications, different versions of the same applications, or different optional functional units of an application.

FIG. 2 is a block diagram illustrating an example directed acyclic graph 200 suitable for use in accordance with the teachings of the present invention. Directed acyclic graph may be used by tree manager 112 of FIG. 1B. According to the illustrated embodiment, graph 200 generally includes nodes, such as a root node 201, and data nodes 203, 205, 207, and 209 that are children of root node 201.

According to one embodiment of the invention, each node 201, 203, 205, 207 and 209 in graph 200 has from 1 to M search attributes 211 (attribute name and value pairs), and holds from 0 to N data attributes 213 (attribute name and value pairs containing software elements). For clarity, search attributes 211 and data attributes 213 are only depicted in root node 201 although they may be present in each node of graph 200. Attribute types 211 and 213 are not unique and are reused throughout the tree.

According to one embodiment of the invention, search manager 118 may define a set of specific nodes of the tree (usually data nodes 203, 207, and 209) via their search attributes 211. They are listed in a priority order. Any nodes which appear between root node 201 and another identified node are discarded because they will be encountered during the traversal. For each identified node, collection manager 120 may traverse the tree in the most direct manner possible, from root node 201 to a data node, collecting data attribute value pairs. For example, if data node 207 is identified, the most direct distribution path would be from root node 201, to data node 205, terminating at data node 207.

If a data attribute 213 is encountered which already has been collected, collection manager 120 may discard the previous software component and replace with the new software component specified by the data attribute. For implementation efficiency, the traversal may be done in reverse order (e.g., 207 to 205 to 201), simply ignoring any software component that have already been obtained. This allows for an equivalent search to be done without the burden of downloading unnecessary software component which may be of significant size.

FIG. 3 is a block diagram illustrating an example distribution tree 300 suitable for use in accordance with the teachings of the present invention. Distribution tree 300 may be used by tree manager 112 of FIG. 1B. As an example of a distribution tree within a single distribution hierarchy, consider the distribution of a game application via a global mobile phone company as depicted in FIG. 3. According to the illustrated embodiment, distribution tree 300 generally includes nodes, such as a root node All Phones 303, and subsequent child nodes North America 307, Europe 311, Asia 315, Canada 319, United States 325, Quebec 327, French 323, and English 329.

For example, a mobile phone in Quebec, Canada used by a French speaking Quebecois may be in the distribution path All Phones->North America->Canada->Quebec->French Language depicted in distribution tree 300. There may be a generic version of the software 301 at All Phones level 303 and a North American Version 305 at North America level 307. Similarly, there may be a European Version 309 at European level 311 and an Asian Version 313 at Asian level 315. It should be obvious to one skilled in the art that different continental or regional versions of the software can exist at any level of distribution tree 300.

In addition, there exists a Canadian extension pack 317 at Canada level 319, and French language code 231 at French Language level 323. In this described embodiment, no components of the software are located at United States level 325, Quebec level 327, or English Language level 329.

According to one embodiment of operation, if a French speaking Quebecois mobile phone user decides to download a French version of the game, search manager 118 may follow distribution tree 300 from the root node All Phones level 303 until the data node identified as French Language level 323 is reached. The distribution path followed along distribution tree 300 may be as follows: 303->307->319->327->323. During a traversal, collection manager 120 will pick up generic version 301, North American Version 305, Canadian extension pack 317, and French language code 321. In this manner, the correct version of the game is assembled by traversing distribution tree 300. It should be obvious to one skilled in the art how this method can be extended to cover various regions and versions.

According to one embodiment of the invention, If the game was completely rewritten for the French language, collection manager 120 may pick up a French Language Version at French Language level 323 and ignore generic version 301 of the software all together, while still picking up Canadian extension pack 317 and North American version 305.

According to one embodiment of the present invention, any number of distribution trees may be utilized. For example, distribution trees may be arranged according to one or more groupings. In the example, a first distribution tree may be arranged according to location while a second distribution tree may be arranged according to type. Utilizing multiple distribution trees may be useful, for example, when some distribution elements are dependent on one arrangement, for example location, and other distribution elements are dependent on another arrangement, for example type. In the example, a grouping based on a language type may have a value of "English" for all computer systems of one location and a value of "Spanish" for all computer systems of another location. Here, a tree according to location may be beneficial as well.

Figure 4:
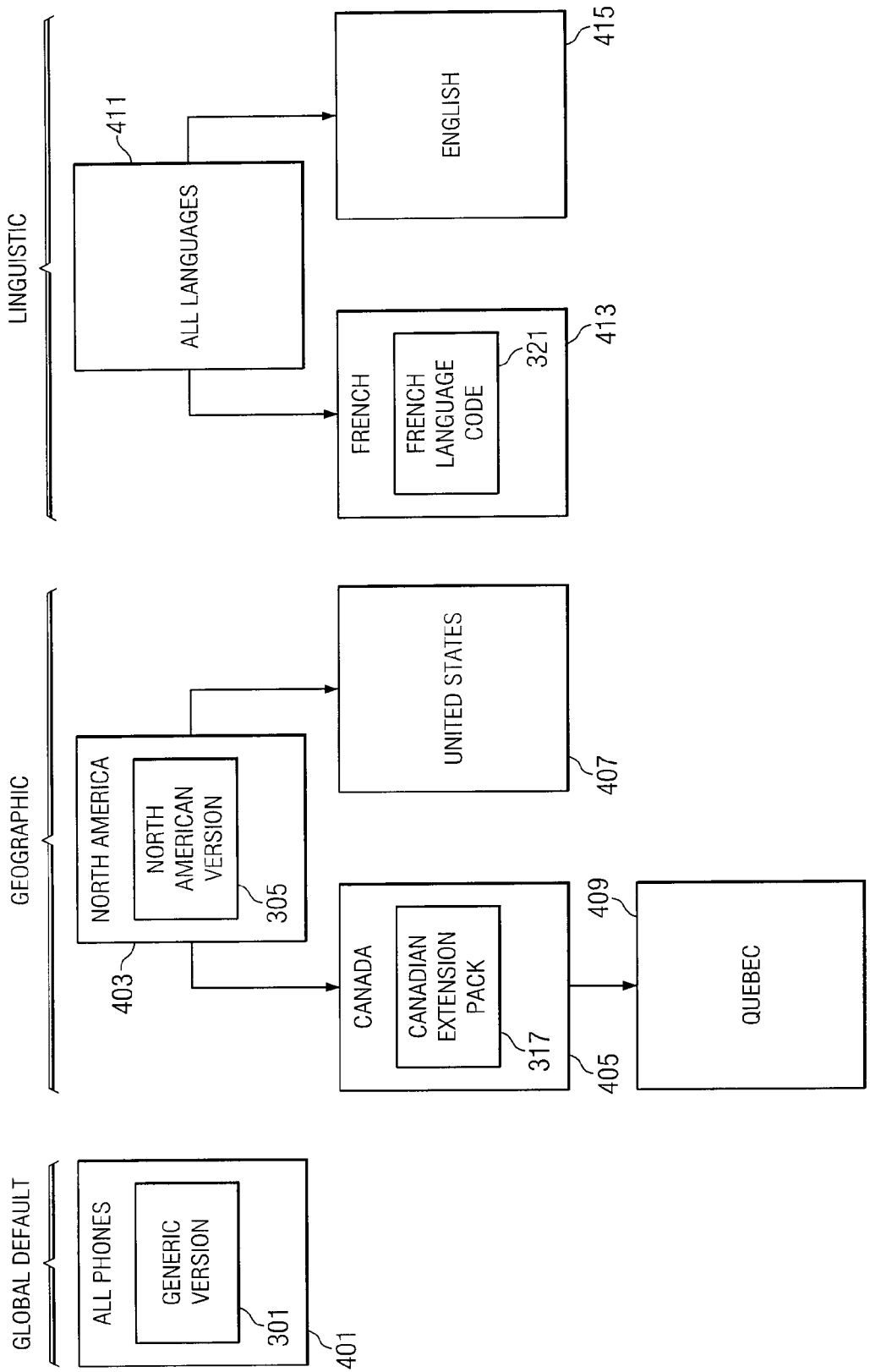
FIG. 4 is a block diagram illustrating multiple example distribution trees suitable for use in accordance with the teachings of the present invention.

For example, instead of placing French Language under Quebec, a phone company may utilize three different trees in a distribution hierarchy as depicted in FIG. 4; one global default (containing a single node All Phones 401), one geographic (containing North America level 403, Canada level 405, United States level 407, and Quebec level 409), and one linguistic (containing All Languages level 411, French Language level 413, and English Language level 415). Priority manager 122 may prioritize the order of these three trees, for example, in the order geographic (most important), linguistic (next most important) and global default (least important). In this case, the generic version 301 could still be at All Phones level 401, and the Canadian extension pack 317 at Canada level 405, while the French language code 321 would be in the linguistic distribution tree at French Language level 413.

According to the embodiment, the application would then be assembled by traversing the three trees in the prioritized order. First, generic version 301 would be picked up from All Phones level 401 in the global default distribution tree, then the French language code would be picked up from the French Language level 413 in the linguistic tree, and finally Canadian extension pack 317 would be picked up from Canada level 405 in the geographic tree.

According to one embodiment of the present invention, if the game was rewritten completely for the French language, then the phone would ignore generic version 301, instead getting the rewritten game from French Language level 401 in the linguistic tree, and then the Canadian extension pack 317 from the geographic tree.

Tree manager 112 may facilitate the distribution of custom software components using a directory. A directory may represent any suitable device operable to store and organize directory information. Example directories may include network operating system directories for managing logins, filesystems, and printers; security directories for single sign-on, web access management, and service management; application specific directories, such as online telephone directories, location directories, and email directories; and publishing directories, such as white pages, yellow pages, and blue pages.

For example, Lightweight Directory Access Protocol (LDAP) is a string based protocol that allows users and applications to access directory data. An example of a typical LDAP directory is a human resource (HR) directory wherein each entry may represent an employee record. Directory entry objects may have attributes. For example, in the case of the HR directory, the employee's last name, first name, email address, job title, office location, and phone number may represent various attributes of an entry. Each directory entry may be uniquely identified by a distinguished name (DN), which is a unique identifier for each directory entry.

Identifying nodes is easily done using LDAP searches. For example, and LDAP search may return a DN that implicitly contains the distribution path back to the root node. This distinguished name can then be used to walk through every ancestor entry from the root down. This offers additional flexibility, in that the directory code reading the distribution need not be aware of the rules followed in constructing the distribution hierarchy. The code can search for the end-points it requires, and will be given the distribution path to follow to reach those end-points, in the form of the DNs of those end-points. Note that the searches can produce multiple results for a single end-point name, and that this is not a problem—the directory code can readily trace each of the resulting DNs, collecting distribution information. This caters well for situations where, for example, a client system is used by two different departments (in different trees)— software used by both departments will be collected by including the machine's name in the distribution tree under both departments.

An advantage of implementing the system on a directory is that the directory can be used as a distributed data backbone. Directories may also be replicated and scaled to a large extent. This avoids the problem of centralized software distribution being a performance bottle neck or a single point of failure, as an arbitrary number of distribution servers can be used, either in a server bank or geographically distributed. Other examples of suitable protocols include, but are not limited to, X.500 and Directory Services Markup Language (DSML), which is a variant of Extensible Markup Language (XML). However, tree manager 112 may facilitate the distribution of custom software components using other suitable techniques for storing and retrieving data.

Another advantage of displaying the information in a tree format, such as the tree format provided in a directory, is that the tree can be represented to the user in a reasonably simple fashion. Rather than displaying the entire tree of available software at once the tree can be restricted to simply show the subset relevant to a particular client system being configured. A GUI can then show the available software as a set of default categories. In the example given above, this would be a global default at the top, linguistic defaults below that, and finally geographic groups. As long as the categories are chosen carefully, the user interface should appear reasonably intuitive.

FIG. 5 is a flow diagram illustrating a method for distributing software components, according to an embodiment of the present invention. The distribution performed by the method FIG. 5 is designed to collect the software components for a particular client device. The method of the invention works from the root node of the distribution tree, through any system groups that include the system of interest, and then finally a data node containing just the specified computer system. As the traversal is made, software components are collected, overwriting any existing software components with the specified components. The method begins at step 502 where a data node is identified. The distribution path to follow from the root node to the data node is determined at step 504. During a traversal of the distribution path at step 506, various software components may be collected at step 508. In this manner, the correct version of the software is assembled and distributed at step 510.

It should be understood that some of the steps illustrated in FIG. 5 may be combined, modified or deleted where appropriate, and additional steps may also be added to the flowchart. Additionally, as indicated above, steps may be performed in any suitable order without departing from the scope of the invention.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for distributing software components, comprising:
   establishing a distribution hierarchy, wherein the distribution hierarchy comprises a plurality of nodes associated with a plurality of software components that correspond to one or more versions of an executable software application;
   determining a distribution path in the distribution hierarchy, wherein the distribution path comprises one or more of the plurality of nodes that are associated with a particular executable software application;
   assembling a particular version of the executable software application by traversing the determined distribution path to select the one or more plurality of software components associated with the one or more of the plurality of nodes in the distribution path,
   wherein assembling the particular version of the executable software application comprises selecting one software component having a particular data attribute from the plurality of software components having the particular data attribute when the plurality of software components having the particular data attribute are associated with the one or more of the plurality of nodes in the distribution path; and
   distributing the particular version of the executable software application.

2. The method of claim 1, wherein establishing the distribution hierarchy comprises providing one or more distribution trees, wherein the one or more distribution trees are arranged according to one or more groupings.

3. The method of claim 1, wherein establishing the distribution hierarchy comprises providing one or more distribution trees, wherein the one or more distribution trees are arranged according to one or more types.

4. The method of claim 1, wherein establishing the distribution hierarchy comprises providing one or more distribution trees, wherein the one or more distribution trees are arranged according to one or more geographic locations.

5. The method of claim 1, wherein determining the distribution path in the distribution hierarchy comprises establishing one or more search attributes that are associated with the particular software application.

6. The method of claim 1, wherein determining the distribution path in the distribution hierarchy comprises:
identifying a root node of the distribution hierarchy; and
identifying one or more subsequent nodes that are children of the root node.

7. The method of claim 1, wherein the distribution hierarchy is implemented in a directory.

8. A system for distributing software components, comprising:
a processor; and
a storage device embodying a program of instructions operable, when executed on the processor, to:
establish a distribution hierarchy, wherein the distribution hierarchy comprises a plurality of nodes associated with a plurality of software components that correspond to one or more versions of an executable software application;
determine a distribution path in the distribution hierarchy, wherein the distribution path comprises one or more of the plurality of nodes that are associated with a particular executable software application;
assemble a particular version of the executable software application by traversing the determined distribution path to select the one or more plurality of software components associated with the one or more of the plurality of nodes in the distribution path,
wherein assembling the particular version of the executable software application comprises selecting one software component having a particular data attribute from the plurality of software components having the particular data attribute when the plurality of software components having the particular data attribute are associated with the one or more of the plurality of nodes in the distribution path; and
distribute the particular version of the executable software application.

9. The system of claim 8, wherein the program of instructions is further operable to provide one or more distribution trees, wherein the one or more distribution trees are arranged according to one or more groupings.

10. The system of claim 8, wherein the program of instructions is further operable to provide one or more distribution trees, wherein the one or more distribution trees are arranged according to one or more types.

11. The system of claim 8, wherein the program of instructions is further operable to provide one or more distribution trees, wherein the one or more distribution trees are arranged according to one or more geographic locations.

12. The system of claim 8, wherein the program of instructions is further operable to establish one or more search attributes that are associated with the particular software application.

13. The system of claim 8, wherein the program of instructions is further operable to:
identify a root node of the distribution hierarchy; and
identify one or more subsequent nodes that are children of the root node.

14. The system of claim 8, wherein the distribution hierarchy is implemented in a directory.

15. A non-transitory computer readable storage media comprising logic, the logic being operable, when executed on a processor, to:
establish a distribution hierarchy, wherein the distribution hierarchy comprises a plurality of nodes associated with a plurality of software components that correspond to one or more versions of an executable software application;
determine a distribution path in the distribution hierarchy, wherein the distribution path comprises one or more of the plurality of nodes that are associated with a particular executable software application;
assemble a particular version of the executable software application by traversing the determined distribution path to select the one or more plurality of software components associated with the one or more of the plurality of nodes in the distribution path,
wherein assembling the particular version of the executable software application comprises selecting one software component having a particular data attribute from the plurality of software components having the particular data attribute when the plurality of software components having the particular data attribute are associated with the one or more of the plurality of nodes in the distribution path; and
distribute the particular version of the executable software application.

16. The non-transitory computer readable storage media of claim 15, wherein the logic is further operable to provide one or more distribution trees, wherein the one or more distribution trees are arranged according to one or more groupings.

17. The non-transitory computer readable storage media of claim 15, wherein the logic is further operable to provide one or more distribution trees, wherein the one or more distribution trees are arranged according to one or more types.

18. The non-transitory computer readable storage media of claim 15, wherein the logic is further operable to provide one or more distribution trees, wherein the one or more distribution trees are arranged according to one or more geographic locations.

19. The non-transitory computer readable storage media of claim 15, wherein the logic is further operable to establish one or more search attributes that are associated with the particular software application.

20. The non-transitory computer readable storage media of claim 15, wherein the logic is further operable to:
identify a root node of the distribution hierarchy; and
identify one or more subsequent nodes that are children of the root node.

21. The non-transitory computer readable storage media of claim 15, wherein the distribution hierarchy is implemented in a directory.

* * * * *